(12) United States Patent
Dabral

(10) Patent No.: US 11,962,914 B2
(45) Date of Patent: Apr. 16, 2024

(54) IMAGE DATA PROCESSING FOR DIGITAL OVERLAP WIDE DYNAMIC RANGE SENSORS

(71) Applicant: Texas Instruments Incorporated, Dallas, TX (US)

(72) Inventor: Shashank Dabral, Allen, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 17/168,224

(22) Filed: Feb. 5, 2021

(65) Prior Publication Data

US 2021/0160418 A1 May 27, 2021

Related U.S. Application Data

(63) Continuation of application No. 14/920,932, filed on Oct. 23, 2015, now Pat. No. 10,944,911.

(60) Provisional application No. 62/068,185, filed on Oct. 24, 2014.

(51) Int. Cl.
| | |
|---|---|
| *H04N 5/235* | (2006.01) |
| *H04N 5/77* | (2006.01) |
| *H04N 23/73* | (2023.01) |
| *H04N 23/741* | (2023.01) |
| *H04N 23/743* | (2023.01) |
| *H04N 23/951* | (2023.01) |

(52) U.S. Cl.
CPC ............ *H04N 23/73* (2023.01); *H04N 5/77* (2013.01); *H04N 23/741* (2023.01); *H04N 23/743* (2023.01); *H04N 23/951* (2023.01)

(58) Field of Classification Search
None
See application file for complete search history.

(56) References Cited

U.S. PATENT DOCUMENTS

| | | |
|---|---|---|
| 5,235,434 A | 8/1993 | Wober |
| 7,474,345 B2 | 1/2009 | Luo et al. |
| 8,264,568 B2 | 9/2012 | Tejada et al. |
| 9,148,580 B2 | 9/2015 | Zhang et al. |

(Continued)

OTHER PUBLICATIONS

Title: Multiplexer URL: https://web.archive.org/web/20120622092355/https://en.wikipedia.org/wiki/Multiplexer Date: Jun. 22, 2012 (Year: 2012).*

(Continued)

*Primary Examiner* — Twyler L Haskins
*Assistant Examiner* — Wesley J Chiu
(74) *Attorney, Agent, or Firm* — Carl G. Peterson; Frank D. Cimino

(57) ABSTRACT

Methods and integrated circuits to process image data from single or multiple digital overlap (DOL) wide dynamic range (WDR) sensors, in which first received pixel data associated with a first exposure of a sensor image is stored in a DDR memory circuit, second received pixel data associated with a second exposure of the image is stored in the first buffer, third received pixel data associated with a third exposure of the image is stored in a second buffer, and fourth received pixel data associated with a fourth exposure of the image is provided to a merge circuit, and merged pixel data is stored in a dynamically partitioned line buffer for processing by an image pipeline circuit to facilitate interfacing multiple DOL WDR sensors in an interleaved fashion.

20 Claims, 6 Drawing Sheets

(56) References Cited

U.S. PATENT DOCUMENTS

| | | | |
|---|---|---|---|
| 2004/0075741 A1 | 4/2004 | Berkey | |
| 2004/0196378 A1* | 10/2004 | Kannermark | H04N 5/2258 348/207.99 |
| 2006/0132622 A1* | 6/2006 | Ikeyama | H04N 7/0105 386/E5.072 |
| 2007/0031044 A1* | 2/2007 | Lin | H04N 19/60 382/232 |
| 2009/0002530 A1 | 1/2009 | Arai et al. | |
| 2010/0134652 A1 | 6/2010 | Takane | |
| 2010/0245620 A1 | 9/2010 | Arai et al. | |
| 2010/0277623 A1 | 11/2010 | Tejada et al. | |
| 2011/0069205 A1 | 3/2011 | Kasai | |
| 2011/0128411 A1* | 6/2011 | Masubuchi | H04N 5/2628 348/E5.031 |
| 2011/0242342 A1* | 10/2011 | Goma | H04N 13/296 348/E5.024 |
| 2012/0026367 A1* | 2/2012 | Noraz | H04N 5/2628 348/240.99 |
| 2012/0170068 A1 | 7/2012 | Ikeda | |
| 2012/0206770 A1* | 8/2012 | Marconi | G06T 3/606 358/1.16 |
| 2012/0262597 A1 | 10/2012 | Frantz | |
| 2013/0033622 A1 | 2/2013 | Li | |
| 2013/0176458 A1 | 7/2013 | Van Dalen | |
| 2013/0202202 A1 | 8/2013 | Hasu | |
| 2013/0242126 A1 | 9/2013 | Motoda | |
| 2013/0243318 A1 | 9/2013 | Honda | |
| 2014/0055638 A1 | 2/2014 | Son | |
| 2014/0184819 A1 | 7/2014 | Chartrand | |
| 2014/0300778 A1 | 10/2014 | Bang | |
| 2015/0022693 A1 | 1/2015 | Appia et al. | |
| 2015/0070569 A1 | 3/2015 | Blayvas | |
| 2015/0207974 A1 | 7/2015 | Mody et al. | |
| 2015/0304583 A1 | 10/2015 | Lee | |
| 2016/0125575 A1* | 5/2016 | Takahashi | G06T 5/50 382/275 |
| 2016/0142633 A1* | 5/2016 | Chao | H04N 5/2624 348/220.1 |
| 2016/0314738 A1 | 10/2016 | Shiohara | |
| 2017/0046294 A1* | 2/2017 | Takano | H04N 1/32587 |
| 2018/0082408 A1 | 3/2018 | Dewhurst | |
| 2021/0321030 A1* | 10/2021 | Desai | H04N 5/35581 |

OTHER PUBLICATIONS

Azami et al., IMX224LQR, IMX225LQR, Diagonal 6.09 mm (Type 1/3) Approx. 1.27M-Effective Pixel Color CMOS Image Sensor, Sony New Product Information, retrieved from the Internet Oct. 7, 2015, http://www.sony.net/Products/SC-HP/new_pro/october_2014/imx224_225_e.html, 7 pgs.

* cited by examiner

IMAGE DATA PROCESSING FOR DIGITAL OVERLAP WIDE DYNAMIC RANGE SENSORS

REFERENCE TO RELATED APPLICATION

This continuation application claims priority to, and the benefit of, U.S. patent application Ser. No. 14/920,932, filed Oct. 23, 2015, which claims benefit of U.S. Provisional Patent Application Ser. No. 62/068,185, entitled "A SCALABLE APPROACH FOR SUPPORTING MULTI-CAMERA CONFIGURATIONS FOR DIGITAL-OVERLAP/STAGGERED-MODE WDR SENSORS", and filed on Oct. 24, 2014, the entirety of both are hereby incorporated by reference.

TECHNICAL FIELD

The present disclosure relates generally to image processing and more particularly to circuits for processing image data from wide dynamic range (WDR) sensors.

BACKGROUND

Cameras and image sensors are in widespread use for surveillance, motion control and other applications. Wide dynamic range sensors are becoming popular for automotive and surveillance applications to preserve the full dynamic range of a natural scene. Automotive applications, for example, include rear view cameras for assisting a driver while backing up, and cameras providing inputs to control systems for avoiding obstacles and controlling braking, steering, acceleration, etc. Current generation WDR sensors, however, are expensive due to the presence of multi-frame image buffers within the sensor. WDR sensors may also suffer from motion artifacts which are difficult to correct in post-processing. Digital overlap (DOL) sensors, also referred to as staggered mode sensors, can be used to reduce cost and motion artifacts, and offer improvements in image quality. However, DOL sensor use leads to increase in the dual data rate (DDR) memory bandwidth requirements of associated image processing systems. Moreover, DDR memory is typically shared for use in multiple tasks, and has access time limitations which are not ideal for use in control applications. In addition, new applications such as vehicle control call for use of multiple WDR sensors, and in particular DOL sensors, using a single interface device, which further exacerbates DDR memory bandwidth limitations.

SUMMARY

Disclosed examples include integrated circuits and methods to process image data from one or more digital overlap wide dynamic range sensors. First pixel data associated with a first exposure of a sensor image is stored in a DDR memory circuit. Second received pixel data associated with a second exposure of the image is stored in a first buffer, and third received pixel data associated with a third exposure of the image is stored in a second buffer. In some examples, fourth received pixel data associated with a fourth exposure of the image is provided to a merge circuit, which obtains the first, second and third pixel data from the DDR memory and the corresponding first and second buffers. In certain examples, merged pixel data is stored in a dynamically partitioned line buffer for processing by an image pipeline circuit to facilitate interfacing multiple DOL WDR sensors.

DETAILED DESCRIPTION

Figure 1:
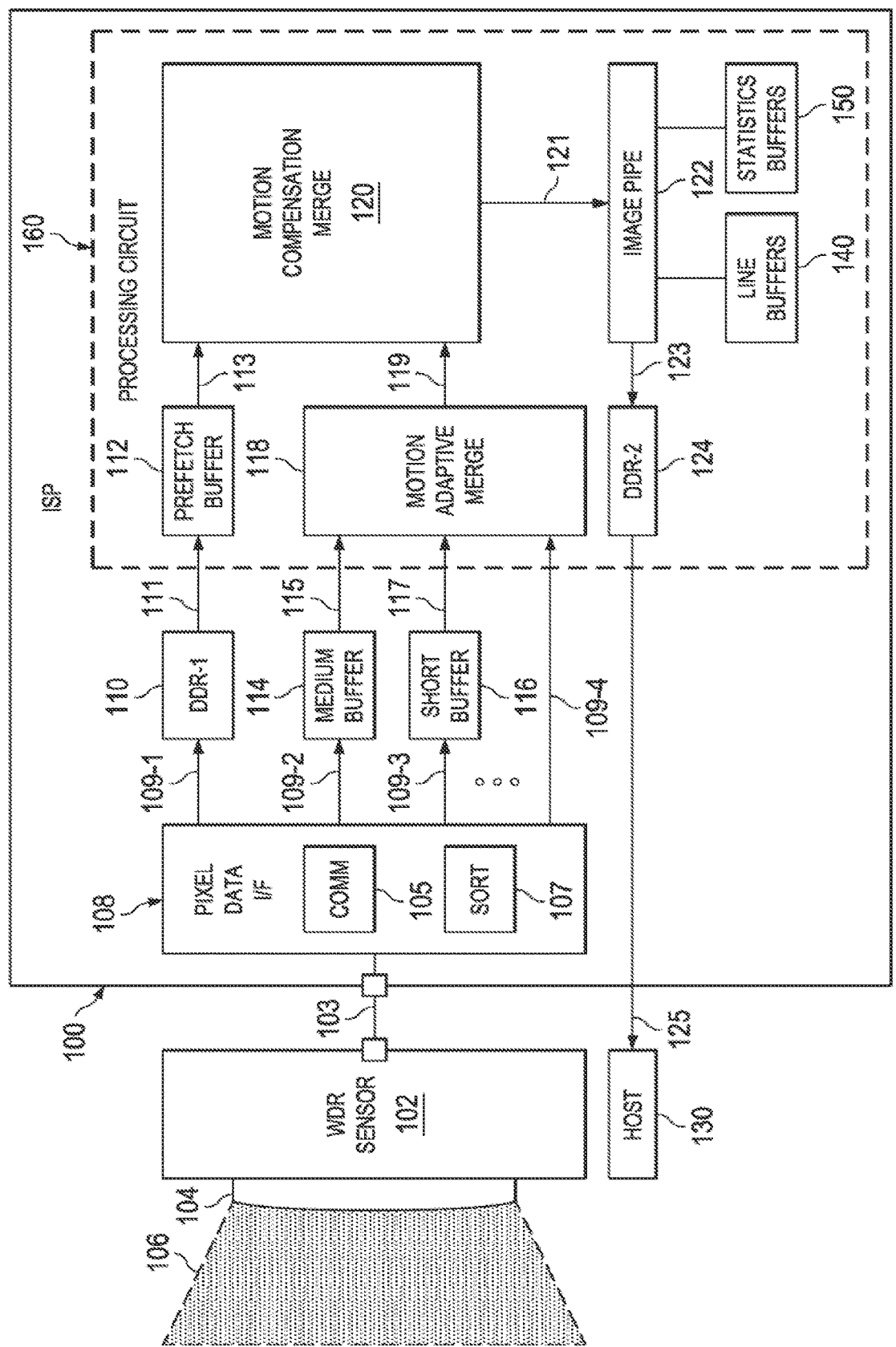
FIG. 1 is a system diagram of an image sensor processor (ISP) integrated circuit (IC) with DDR memory, medium and short buffer circuits for interfacing a wide dynamic range (WDR) sensor.

In the drawings, like reference numerals refer to like elements throughout, and the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . ."

FIG. 1 shows an image sensor processor (ISP) integrated circuit 100 interfacing a WDR sensor 102 via a communications interconnection 103 which can be a single electrical connection or multiple connections. In one possible implementation, the integrated circuit 100 is mounted to a printed circuit board (PCB, not shown), and includes one or more pins or terminals electrically connected to a board-mounted connector via conductive PCB traces, and the WDR sensor 102 is coupled with the connector via a cable (not shown). The integrated circuit 100 includes a variety of blocks or circuits, which can be dedicated logic circuits, programmable logic circuits, and/or functions implemented by digital processor circuitry.

The sensor 102 in one example is a DOL sensor that includes a lens structure 104 that senses and detects light within a corresponding sensor field 106. The IC 100 includes a pixel data interface circuit 108 including a communications circuit 105 to receive pixel data 109 corresponding to multiple exposures of an image from the DOL WDR sensor 102, as well as a sorting circuit 107. In one example, the communications circuit 105 is a mobile industry processor interface (MIPI) circuit that supports a camera serial interface (CSI) communications protocol to receive the pixel data 109 from the DOL sensor 102. For example, the communications circuit 105 supports MIPI CSI-2 or CSI-3 communications, and the interconnection 103 in one example includes multiple IC pins and corresponding circuit board traces and connections to the sensor 102, providing an integer number N data line connections between the sensor 102 and the pixel data interface circuit 108, and may further include one or more connections for clock signals. Multiple connections may be provided in certain examples for each data line (e.g., Data0+, Data0−, . . . , DataN+, DataN−, Clock+, Clock−, SCL, SDA for CSI-2 with D-PHY), and each data line may have an associated clock signal in other examples (e.g., Data0_A, Data0_B, Data0_C, . . . DataN_A, DataN_B, DataN_C, SCL, SDA for CSI-2 with C-PHY).

The sensor 102 is a DOL sensor that provides pixel data corresponding to multiple exposures of an image corresponding to the sensor field 106. In particular, the sensor 102 provides first pixel data 109-1 corresponding to a first exposure of the sensed image at a first exposure time, in this case the longest exposure time of the multiple exposures, as well as second pixel data 109-2 corresponding to a second exposure obtained using a shorter second exposure time. In the illustrated example, the sensor 102 provides four sets of pixel data, including third pixel data 109-3 corresponding to a third exposure obtained using a still shorter third exposure time, as well as forth pixel data 109-4 corresponding to a fourth exposure obtained using an even shorter fourth exposure time. The gradual decrease in the exposure time between successive exposures obtained using the DOL sensor 102 in this example provides pixel data 109 corresponding to four exposures of a captured image which are slightly temporally spaced from one another, each having different exposure levels. This allows the full dynamic range of the WDR sensor 102 to be used for a given obtained image. The different exposures have decreasing spacing between them. The temporal spacing between the first and second exposures in one example is on the order of 200 lines of pixel data, whereas the spacing between the second and the third exposure is 10-15 lines, and the spacing between the third and fourth exposures is 2-3 lines. The IC 100 in one example stores pixel data for the first exposure in dual data rate memory, and stores other exposure data in local buffers or directly provides such to merge processing circuitry (without storing the other exposure data in the dual data rate memory) to reduce the required dual data rate memory. The ISP IC 100 includes merge circuitry 118, 120 to merge the pixel data 109 corresponding to the multiple images in order to construct merged image data 121 for further processing using an image pipeline circuit 122 (labeled "IMAGE PIPE" in the drawing) and use by a host system 130. In particular, the IC 100 includes a processing circuit 160 with a motion adaptive merge circuit 118 operating on the second, third and fourth pixel data 109-2, 109-3 and 109-4, along with a motion compensation merge circuit 120 that provides a single set of merged pixel data 121 corresponding to an obtained image to the image pipeline circuit 122.

The IC 100 also includes one or more dual data rate (DDR) memory circuits, including a first DDR memory 110 (DDR-1) and a second DDR memory 124 (DDR-2), as well a first buffer 114 including a first plurality of dedicated storage elements (e.g., SRAM), and a second buffer 116 including a second plurality of dedicated storage elements (e.g., SRAM). In one example, the first buffer 114 operates as a "medium" buffer for medium exposure time pixel data 109-2, and the second buffer 116 operates as a "short" buffer for storing shorter exposure time pixel data 109-3. The first DDR memory circuit 110 in this example (DDR-1) operates to store the longest exposure time first pixel data 109-1, and the shortest exposure time forth pixel data 109-4 is provided directly from the pixel data interface circuit 108 to the motion adaptive merge circuit 118.

The pixel data interface circuit 108 includes a sorting circuit 107 operatively coupled with the communications circuit 105. The sorting circuit 107 stores the first received pixel data 109-1 associated with the first exposure of the sensor image in the DDR memory circuit 110, and stores the second received pixel data 109-2 associated with the second exposure of the image in the first buffer 114. In addition, the sorting circuit 107 stores the third received exposure data 109-3 associated with the third exposure of the image in the second buffer 116. In this manner, the sorting circuit 107 advantageously employs the DDR memory 110 for the longest exposure time pixel data 109-1, and uses quicker access indicated buffer circuits 114 and 116 to store the shorter exposure time pixel data 109-2 and 109-3, respectively. Moreover, in the illustrated example having fourth pixel data 109-4 received from the sensor 102, the sorting circuit 107 provides the fourth received pixel data 109-4 associated with the fourth exposure of the image to the merge circuit 118 without intermediate buffering. Unlike other approaches relying solely on DDR memory for storing image data prior to merge processing, the IC 100 advantageously employs the sorting circuit 107 and one or more dedicated buffers 114, 116 in combination with a DDR memory to intelligently use DDR memory 110 to store the longest exposure time pixel data 109-1, while using faster access dedicated buffers circuits 114, 116 for shorter exposure time pixel data 109-2 and 109-3. Moreover, the disclosed examples also avoid excessive circuit cost and size associated with exclusively using SRAM or other buffers for storing all the exposure data, and provide an intelligent trade-off between DDR memory bandwidth and silicon area for sensor interface integrated circuits.

In addition, the motion adaptive merge circuit 118 is used for motion-related processing with respect to the second and subsequent exposure pixel data sets 109-2, 109-3 and 109-4, with the fourth pixel data 109-4 being provided directly from the pixel data interface circuit 108 to the motion adaptive merge circuit 118. The first buffer circuit 114 provides buffered second exposure pixel data 115 to the merge circuit 118, and the second buffer circuit 116 provides buffered third exposure pixel data 117 to the merge circuit 118. In this example, moreover, the processing circuit 160 further includes a prefetch buffer circuit 112 receiving the previously stored first exposure pixel data 111 from the DDR memory 110. The prefetch buffer 112 in this example provides the buffered first exposure pixel data 113 to the motion compensation merge circuit 120. The motion adaptive merge circuit 118 provides pre-merged pixel data 119 corresponding to the second, third and fourth exposure pixel data 115, 117 and 109-4 to the motion compensation merge circuit 120. The merge circuits 118, 120 process the first, second, third and fourth received pixel data 109-1, 109-2, 109-3 and 109-4 to create merged pixel data 121 representing the image obtained from the sensor 102.

The motion compensation merge circuit 120 provides the merged pixel data 121 to the image pipeline circuit 122. The processing circuit 160 in this example also includes a line buffer circuit 140 to store at least one line of pixel data 121 for processing by the image pipeline circuit 122. In one example, the merge circuit 120 provides the merged pixel data 121 to the line buffer circuit 140. In addition, the processing circuit 160 includes a statistics buffer circuit 150 with a plurality of statistics buffer partitions to store statistics data for processing by the image pipeline circuit 122.

The image pipeline circuit 122 performs various image processing functions, including filtering and other algorithms and computations to provide processed image data 123 to the second DDR memory 124. The second DDR memory 124 provides processed image data 125 to the host system 130. As further described below in connection with FIGS. 3-5, the integrated circuit 100 in certain examples includes multiple pixel data interface circuits and associated buffers 114, 116 and is configurable or scalable to support multiple DOL WDR sensor interfaces. This facilitates using a single integrated circuit device 100 to support either a single high resolution camera sensor 102 and/or multiple camera sensor sources of image data, for example to interface with multiple low resolution sensors 102. As seen above, the intelligent use of DDR memory 110 to store first image data associated with the longest exposure time, and use of buffer circuits 114 and 116 for shorter exposure time pixel data economizes the use of shared DDR memory 110 while supporting the multiple exposure pixel data associated with the DOL sensor 102. Moreover, the IC 100 in certain examples is scalable for use with multiple sensors 102 while still supporting DOL sensors and minimizing DDR Bandwidth impacts. In one example, the IC 100 is configured to interface multiple DOL WDR sensors 102 in an interleaved fashion.

The example IC 100 exploits the delay pattern of successive exposures in the digital sensors 102. For a four exposure mode example, the delay between the first two exposures is significant (e.g., up to 250 splay lines), whereas the cumulative delay between the second, third and fourth exposures is only in the order of 10-13 lines. The IC 100 provides a buffering scheme parsing the storage of the first, second and third exposure pixel data sets 109-1, 109-2 and 109-3 between the DDR memory 110 and the buffers 114, 116 which allows the first exposure to be buffered through the DDR memory 110 whereas the other 3 exposures are routed via local SRAM buffers or directly to the merge engine 118, 120 and the downstream processing circuitry 122. In addition, the IC 100 is scalable across resolution and number of sensors 102 by proposing scalable memory architecture for the line and statistics buffers 140 and 150. This facilitates use of an optimal amount of local storage for addressing multiple copies of a low-resolution sensor 102 or a single higher resolution sensor 102. A similar scheme is used for the dedicated line memories in other examples of the ISP IC 100, allowing the IC 100 to process pixel data from multiple sensors 102 in an interleaved fashion with an interleaving granularity as low as one line.

Figure 2:
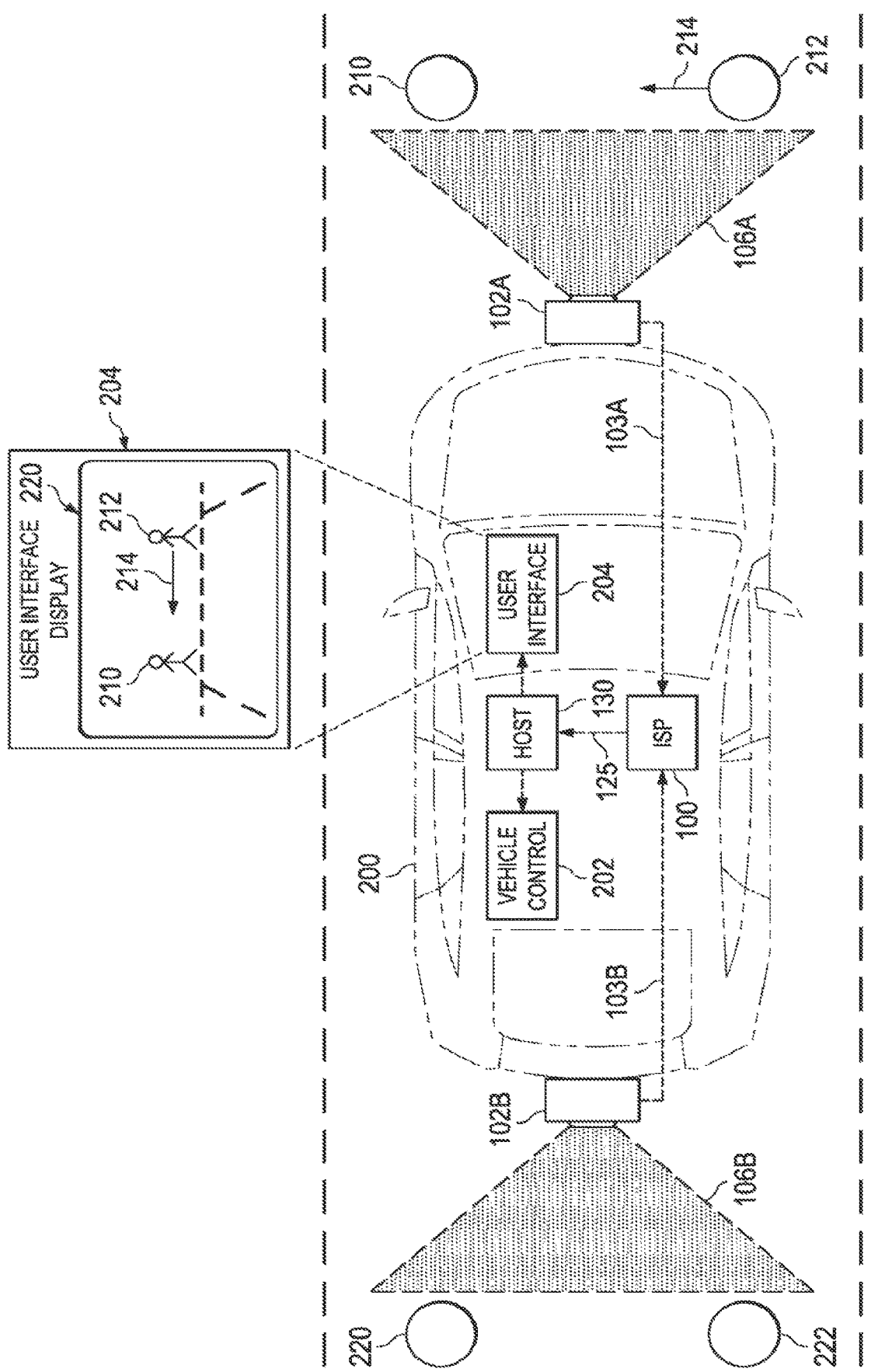
FIG. 2 is a partial top plan view of a vehicle including front and rear facing WDR sensors and the ISP circuit of FIG. 1.

FIG. 2 shows one example implementation in a vehicle 200 including front and rear facing WDR sensors 102A and 102B, respectively. The WDR sensors 102 are operatively coupled with an ISP integrated circuit 100 as described above in order to provide image data 125 to a host processor 130. In one example, the host processor 130 provides image data for use by a vehicle control processor or circuit 202 that manages or influences one or more engine control and/or steering/breaking control functions in the vehicle 200. In addition, or in combination, the host processor 130 may provide image data (rendering the image data 125) to a user interface display (UI) 204, for example, a vehicle dashboard display screen. As shown in FIG. 2 the forward facing sensor 102A provides images from a sensor field 106A, providing views of a first object 210 and a second object 212 moving along direction 214. In this example, moreover, the rear facing sensor 102B has an associated sensor field 106B allowing the sensor 102B to obtain images showing a third object 220 and a fourth object 222 rearward of the vehicle 200. As further shown in FIG. 2, in one example, the host processor 130 provides a forward image 220 to the user interface display 204 showing the objects 210 and 212 including movement of the object 212 in the direction 214. As can be appreciated, motion adaptive merge processing by the merge circuit 118 (FIG. 1) facilitates intelligent vehicle control and aids a viewing user in identifying motion of one or more objects (e.g., object 212 in FIG. 2) for user operation of the vehicle 200 and/or for automated control of the vehicle by the control processor 202.

Figure 3:
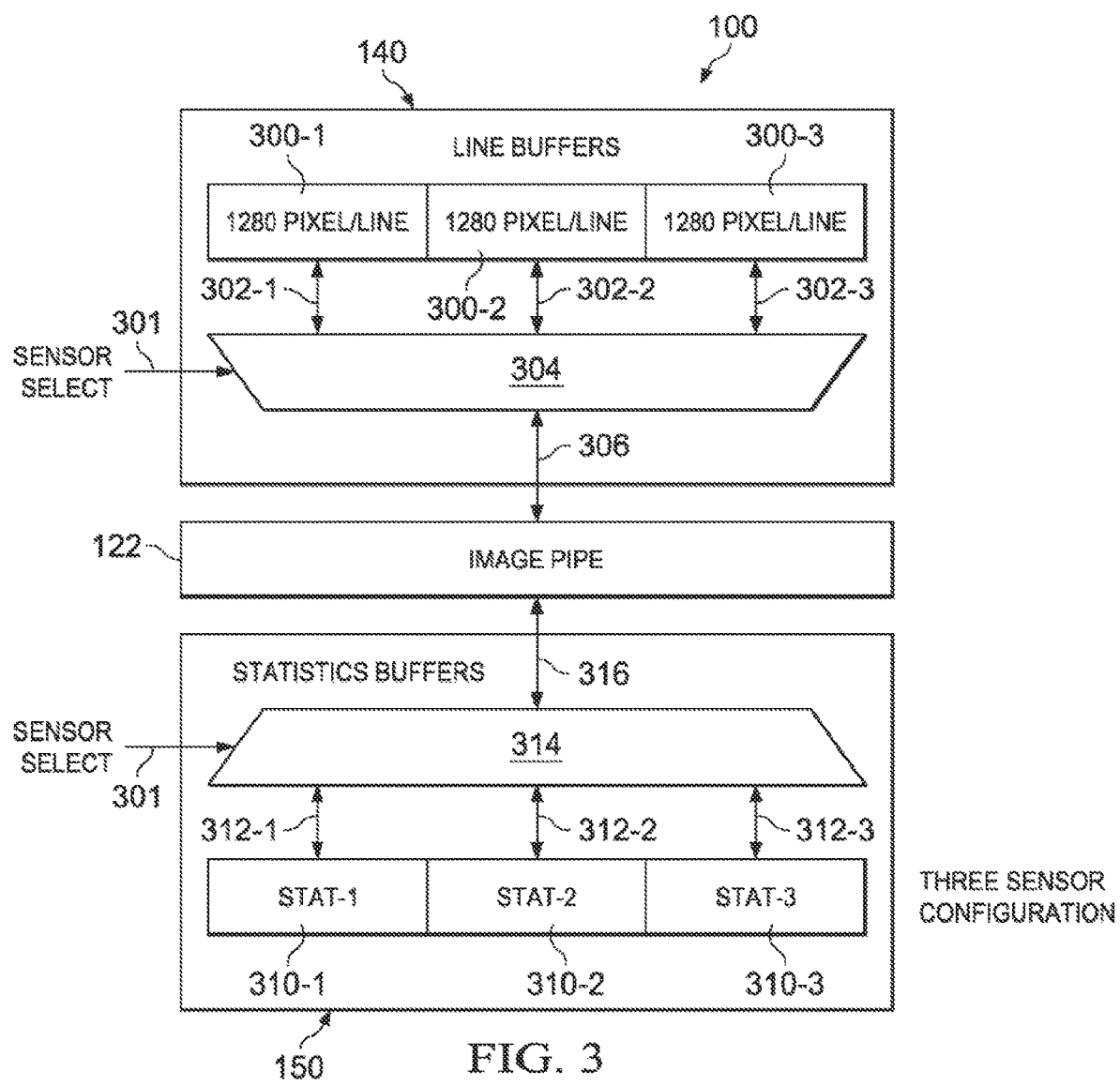
FIG. 3 is a schematic diagram of an image pipeline circuit with adaptable line buffers and statistics buffers for a three sensor configuration in the ISP of FIG. 1.
Figure 4:
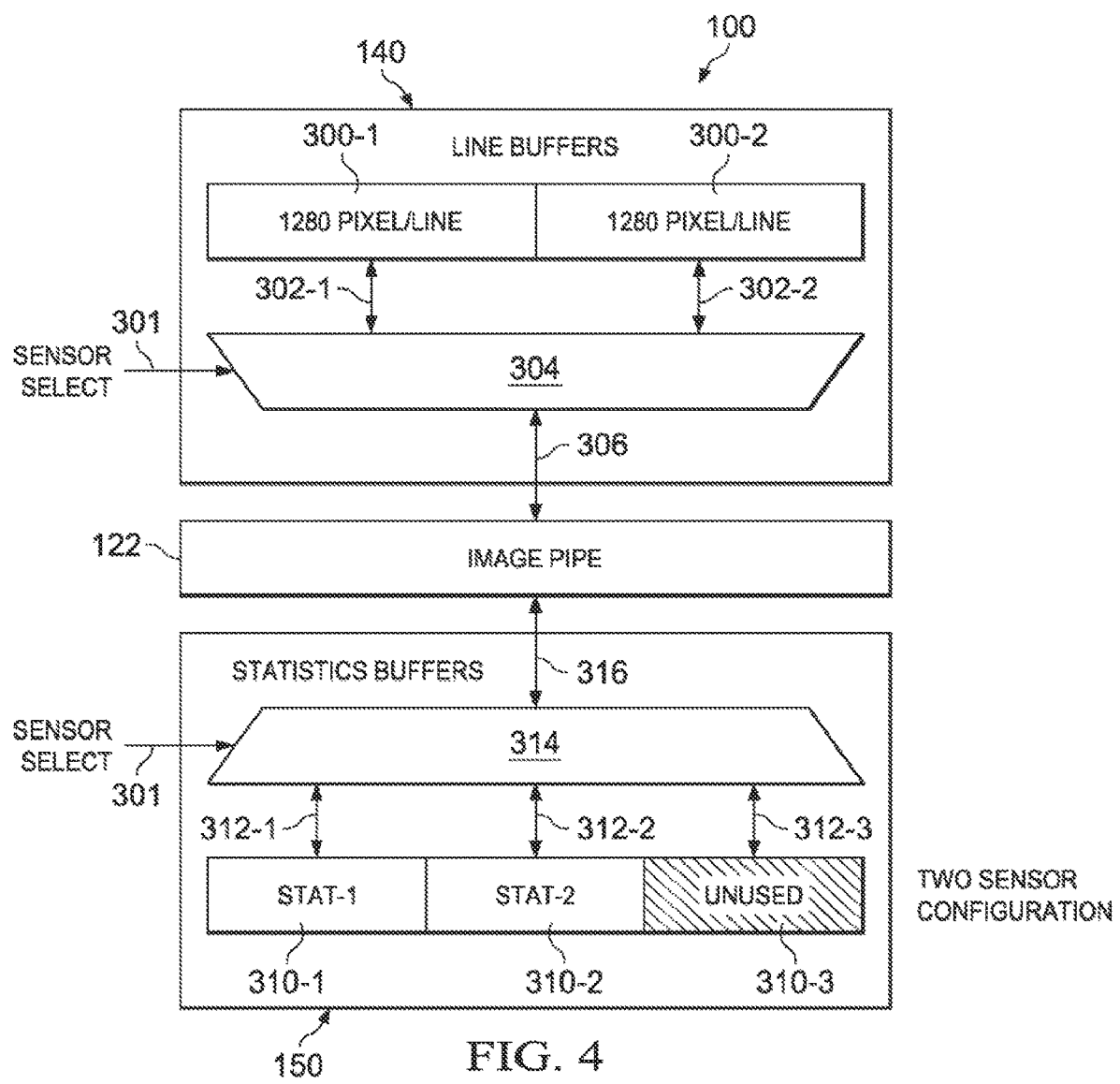
FIG. 4 is a schematic diagram of the image pipe circuit of FIG. 3 for a two sensor configuration.
Figure 5:
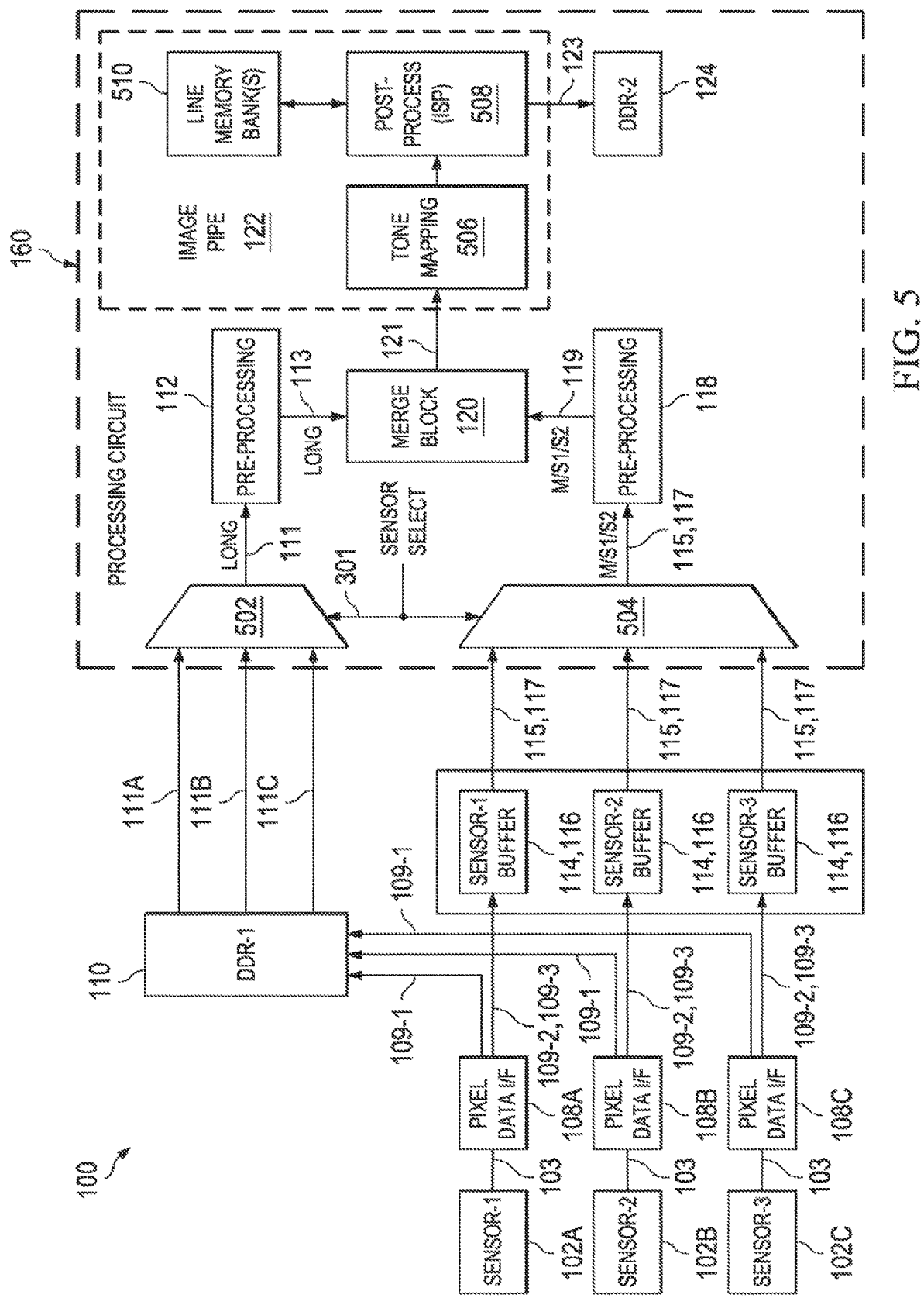
FIG. 5 is a schematic diagram of another ISP example interfacing three WDR sensors.

Referring also to FIGS. 3-5, the ISP IC 100 provides dynamically reconfigurable support for interfacing single or multiple sensors 102 with a host system 130. For example, the IC 100 in FIG. 5 interfaces three DOL WDR sensors 102 in an interleaved fashion by initially processing a first line of pixel data for the first sensor 102A, followed by processing of a first line associated with sensor 102B, after which a first line of pixel data from sensor 102C is processed. After this, the second lines of pixel data from the sensors 102A-102C are then processed in interleaved fashion. FIG. 3 shows an example image pipeline circuit 122 for a three sensor configuration in the ISP IC 100 of FIG. 1, and FIG. 4 shows reconfiguration of the IC 100 for a two sensor configuration. In these examples, the line buffer circuit 140 is dynamically configurable to define a plurality of partitions 300. In the example of FIG. 3, the line buffer circuit 140 is configured to define three partitions 300-1, 300-2 and 300-3. In this example, each partition 300 provides storage for one or more lines of pixel data for 1280 pixels, although other buffer partition sizes can be used in other examples. The line buffer circuit 140 in this example includes a first multiplexer 304 operative according to a sensor select signal 301 (labeled "SENSOR SELECT" in the drawings). The sensor select signal 301 can be a single binary signal, or can be a multi-bit signal in certain examples. The first multiplexer 304 provides output data 306 (e.g., merged pixel data 121) from a selected partition 300 of the line buffer 142 the image pipeline circuit 122 based on the signal 301. This provides separate selectable access by the image pipeline circuit 122 to pixel data 302-1, 302-2 or 302-3 corresponding to a given one of the connected sensors 102. This in turn, facilitates cost effective operation using a single image pipeline circuit 122 for interfacing with multiple DOL wide dynamic range sensors 102. In addition, the IC 100 in this example includes a plurality of statistics buffer partitions 310 in the statistics buffer circuit 150, including a first partition 310-1, a second partition 310-2 and a third partition 310-3. A second multiplexer 314 receives pixel data 312-1, 312-2 and 312-3 from the corresponding buffer partitions 310-1, 310-2 and 310-3, and provides output data 316 to the image pipeline circuit 122 according to the sensor select signal 301. In one example, the statistics buffer partitions 310 are static, whereas the line buffer partitions 300 can be configured according to the number of connected sensors 102. For example, FIG. 4 illustrates a two sensor configuration in which the line buffer circuit 140 has been reconfigured by the image pipeline circuit 122 in order to define two 1280 pixel line buffer partitions 300-1 and 300-2 that provide corresponding data 302-1 and 302-2 to the first multiplexer 304. In this example, however, the statistics buffer partitions 310-1, 310-2 and 310-3 remain fixed, with the third statistics buffer partition 310-3 being unused for a two sensor configuration.

FIG. 5 illustrates another ISP IC 100 example showing operative interconnection of three DOL WDR sensors (labeled SENSOR-1), 102B (SENSOR-2 and 102C (SENSOR-3). The IC 100 and FIG. 5 includes three corresponding pixel data interface circuits 108A coupled with the sensor 102A, 108B coupled with sensor 102B, and 108C coupled with sensor 102C. The individual pixel data interface circuits 108 include a communications circuit 105 and a sorting circuit 107 as described above in connection with FIG. 1. The individual pixel data interface circuits 108, moreover, provide corresponding long exposure (first exposure) pixel data 109-1 to the first DDR memory 110, and the DDR memory 110 provides the corresponding long exposure output data 111A, 111B and 111C to a multiplexer 502. The multiplexer 502 provides a selected first exposure data set 111 to a long exposure preprocessing circuit 112 according to the sensor select signal 301, and the preprocessing circuit 112 provides output pixel data 113 to the merge block circuit 120.

Similar to FIG. 1, the IC 100 and FIG. 5 includes three sets of first and second exposure buffers 114, 116 (labeled SENSOR-1 BUFFER, SENSOR-2 BUFFER, and SENSOR-3 BUFFER. The buffers 114 and 116 in one example include SRAM memory elements that store one or more lines of pixel data per sensor. For example, the first buffer 114 stores 15 lines of the second pixel data 109-2 (e.g., medium exposure pixel data) and the buffer 116 stores 2-3 lines of the third pixel data (e.g., first short exposure pixel data). The buffers 114 and 116 are used to temporally align the data 109 corresponding to all of the exposures so that they can be sent to the merge circuit 120 in an aligned fashion.

The individual buffer sets 114, 116 receive second and third exposure pixel data 109-2, 109-3 from the corresponding pixel data interface circuit 108 and provide corresponding outputs 115, 117 to a multiplexer 504. The multiplexer 504 provides the selected second and third exposure pixel data 115 and 117 to a second preprocessing circuit 118 that performs image processing functions which are best suited prior to merge in the linear domain. As previously mentioned, the fourth pixel data 109-4 may be provided from the currently selected pixel data interface circuit 108 to the multiplexer 504 in certain embodiments without intermediate storage in an actual buffer circuit 114, 116. In other examples, the fourth pixel data 109-4 may be buffered in a dedicated buffer, from which such data is provided to the multiplexer 504. The preprocessing circuits 112 and 118 in one example perform image processing on independent exposures of the image. This is in contrast to the image pipeline circuit 122 or the post processing circuit 508 thereof which work on merged and tone mapped image data 121. The pre-processing blocks 112 and 118 in one example implement image processing algorithms and filters which operate on linear pixel data. The data outputs 113 and 119 from the preprocessing circuits 112 and 118 are respectively provided as input data to the merge circuit 120. The merge circuit 120 receives pixel data corresponding to multiple exposures (e.g., four exposures in one example) of the same image, and merges them to create a single image of higher dynamic range. In one example, the four independent exposures may be 12 bits/pixel each. The merge circuit 120 merges these four exposures to provide merged pixel data 121 including up to 24 bits/pixel. In this example, the merge circuit 120 reduces the number of images/exposures (four input exposures, one output image) but increases the pixel depth.

The merged pixel data 121 for the selected sensor 102 is provided to a tone mapping circuit 506 of the image pipeline circuit 122. The tone mapping circuit 506 receives a higher bit width image (e.g., up to 24 bits) and performs tone mapping that reduces the bit width (e.g., a 12 bit output). The tone mapping circuit 506 in one example reduces the bit depth while still preserving the highlights and lowlight details of the image represented by the merged pixel data 121. The image pipeline circuit 122 in this example also includes a post-process (image sensor processing) circuit 508. The circuit 508 includes filter, color correction, gamma correction, and/or other processing circuits operating on the tone mapped image data from the tone mapping circuit 506. A line memory bank circuit 510 includes local memory circuits (e.g., SRAM) that store one line of pixel data internally, and multiple lines of pixel data are stored to facilitate vertical image filter operations in the post-process circuit 508. The post-process circuit 508 of the image pipeline circuit 122 provides the processed image data 123 to the second DDR memory 124 from which the data 123 can be obtained by a host system (e.g., host 130 in FIG. 1).

Figure 6:
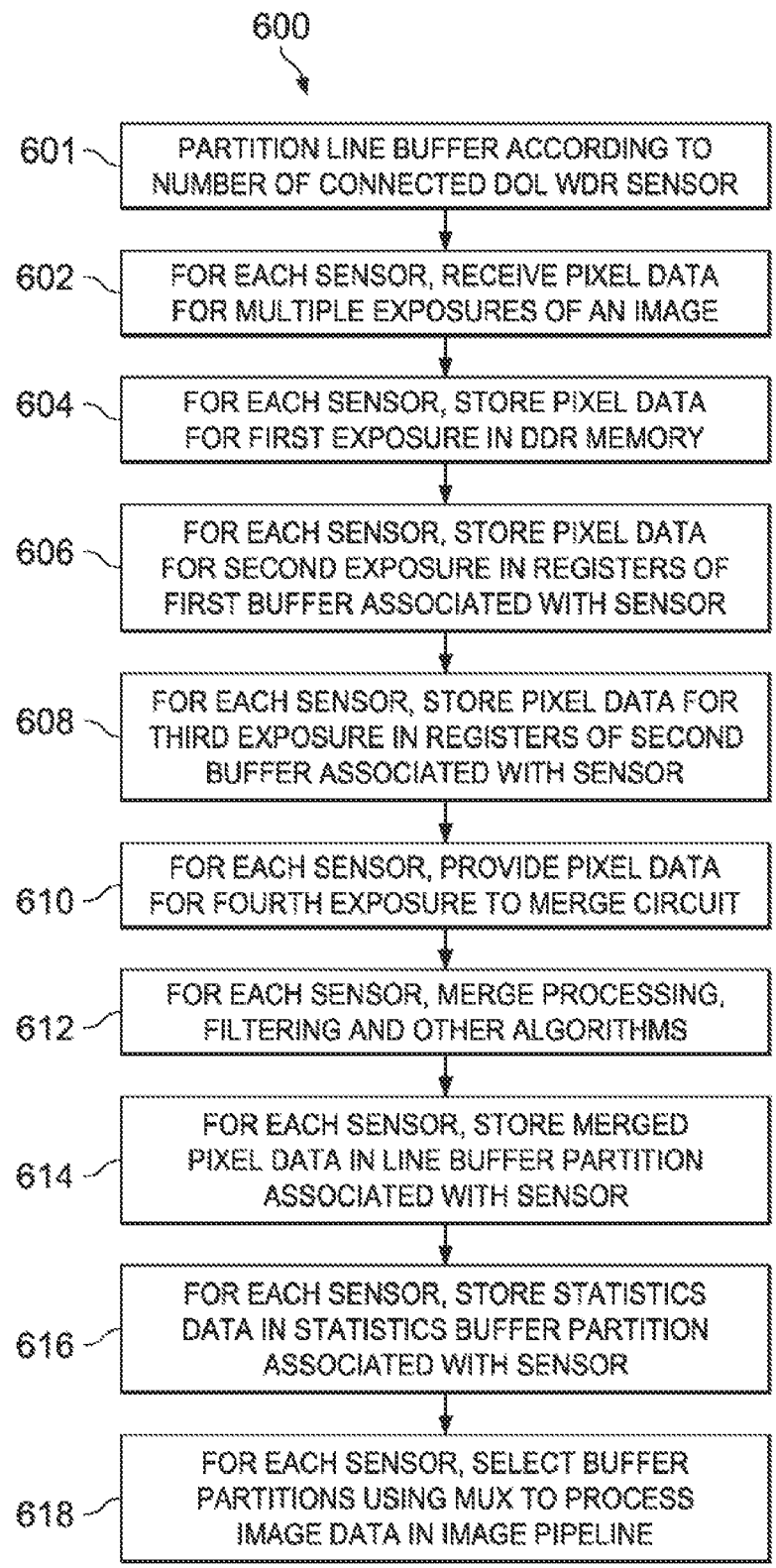
FIG. 6 is a flow diagram of an image processing method.

Referring also to FIG. 6, a process or method 600 is illustrated to process image data from a plurality of DOL WDR sensors 102, and can be implemented, for example, in the above-described integrated circuits 100. The method 600 includes partitioning a line buffer (e.g., line buffers circuit 140 in FIGS. 1, 3 and 4 above) according to the number of connected sensors 102. For example, the integrated circuit 100 can be configured for operative interconnection to an integer number N DOL sensors 102, and the line buffer memory 140 in FIG. 3 can be partitioned to define an integer number N buffer partitions 300-1, 300-2, . . . , 300-N. At 602, for each sensor, pixel data is received for multiple exposures of an image. In the DOL examples described above, pixel data for multiple exposures can be provided to the integrated circuit 100 from the sensor or sensors 102 concurrently, with one or more lines of pixel data for a first (e.g., longest) exposure arriving first, with the initial lines of the second (medium exposure time) pixel data arriving after the first line pixel data from the first exposure, but before the last line of the first exposure pixel data. In one example, there is a large line delay between the frame start of the first and second exposures, such as around 250 lines of delay between the start of the first exposure and the start of the second exposure. In this regard, the DDR memory 110 is used to store at least the first 250 lines of pixel data 109-1 from the first exposure. Thereafter, the first line of the third (e.g., short exposure time) pixel data arrives, possibly while line data from the first and second pixel data is still arriving, etc. In this regard, parallel data transfer between the sensor 102 and the corresponding pixel data interface circuit 108 may allow overlapping receipt of more than one exposure at a given time in certain examples. In other examples, line data from the first, second, third and/or fourth exposures may be interleaved, thereby arriving at the pixel data interface circuit 108 generally contemporaneously. As mentioned above, moreover, the integrated circuit 160 may contemporaneously receive exposure pixel data from more than one sensor 102.

At 604 for each sensor 102, the pixel data for the first exposure is stored in DDR memory. For example, the sorting circuit 107 of the pixel data interface circuit 108 stores the first received pixel data 109-1 associated with the first exposure of the corresponding image 220 in the DDR memory circuit 110 at 604 in FIG. 6. At 606, for each sensor, the sorting circuit 107 stores pixel data for the second exposure in storage elements of a first buffer associated with the corresponding sensor 102 (e.g., first buffer circuit 114 stores second pixel data 109-2 in FIG. 1). At 608, for each sensor, the sorting circuit 107 stores pixel data for the third exposure (e.g., 109-3) in storage elements of a second buffer associated with the sensor 102 (e.g., second buffer circuit 116). For each sensor, pixel data for a fourth exposure is provided to a merge circuit at 610 (e.g., provided to the merge circuit 610 without any buffering). For example, the sorting circuit 107 provides forth pixel data 109-4 to the motion adaptive merge circuit 118 in FIG. 1).

At 612 in FIG. 6, merge processing, filtering and other algorithms are performed for each sensor, and the resulting pixel data (e.g., data 121 above) is stored at 614 in a line buffer partition associated with the corresponding sensor 102 (e.g., partitions 300 in FIGS. 3 and 4 above). At 616, statistics data for each sensor is stored in a corresponding statistics buffer partition (e.g., statistics buffers partitions 310 in the circuit 150). At 618, for each sensor 102, the line and statistics buffer partitions are selected using a multiplexer (e.g., multiplexers 304 and 314) to process the image data in the image pipeline circuit 122.

Described examples provide interfacing and signal processing for multiple exposure digital overlap WDR sensors 102 that provide two or more exposures for a given image (e.g., for in the above examples). Moreover, the described examples provide a single image pipeline circuit 122 and associated buffers that are scalable for operation with a single sensor 102 or multiple sensors 102. For example, one or two high resolution sensors 102 with 2×1080 pixels at 60 frames per second (e.g., 288 MHz) can be supported by a single ISP IC 100, or three or more lower resolution sensors 102 can be interfaced by the IC 100 the (3×1.4 Mp at 60 frames per second (e.g., 300 MHz) can be interfaced by the IC 100. In another application, the IC 100 can accommodate for DOL sensors (4×1.4ultiple lower resolution sensors (4×1.4 Mp at 30 frames per second (e.g., 200 MHz), where the selective use of the storage buffer circuits 114 and 116 mitigate the bandwidth impact on the shared DDR memory 110 while facilitating use of a single image pipeline circuit 122 and associated circuits 118, 122 support multiple sensors 102. The integrated circuit 100 can also be used with compounded sensors in addition to DOL/staggered mode sensors 102 in which pixel data 109 for separate exposures is provided, and is skewed by one or more lines (e.g., temporally offset) at the interface circuit 108. The ISP IC 100 merges and can perform motion compensation.

The above examples are merely illustrative of several possible embodiments of various aspects of the present disclosure, wherein equivalent alterations and/or modifications will occur to others skilled in the art upon reading and understanding this specification and the annexed drawings. Modifications are possible in the described embodiments, and other embodiments are possible, within the scope of the claims.

What is claimed is:

1. An integrated circuit comprising:
a shared memory;
a first buffer;
a plurality of pixel data interface circuits configured to individually receive pixel data corresponding to multiple exposures of an image from a corresponding digital overlap (DOL) wide dynamic range (WDR) sensor, the pixel data interface circuits configured to store first pixel data corresponding to one or more first ones of the exposures of the image in the shared memory, and to store second pixel data corresponding to one or more second ones of the exposures of the image in the first buffer;
a first multiplexer including two or more inputs coupled to the shared memory;
a second multiplexer including two or more inputs coupled to the first buffer;
a merge circuit configured to receive the first pixel data from the shared memory via the first multiplexer, receive the second pixel data from the first buffer via the second multiplexer, and process the first and second pixel data to create merged pixel data representing the image; and
an image pipeline circuit configured to process the merged pixel data representing the image.

2. The integrated circuit of claim 1, further comprising:
a statistics buffer including a plurality of statistics buffer partitions configured to store statistics data for processing by the image pipeline circuit; and
a third multiplexer operative according to a sensor select signal to provide selected statistics data from the statistics buffer to the image pipeline circuit.

3. The integrated circuit of claim 1, further comprising:
a line buffer including a plurality of partitions individually configured to store at least one line of the merged pixel data representing the image for processing by the image pipeline circuit; and
a third multiplexer operative according to a sensor select signal to provide selected pixel data from a selected partition of the line buffer to the image pipeline circuit.

4. The integrated circuit of claim 3, wherein the line buffer is dynamically configurable to define the plurality of partitions.

5. The integrated circuit of claim 3, wherein the line buffer is dynamically configurable to define the plurality of partitions in response to a number of sensors connected to the integrated circuit.

6. The integrated circuit of claim 1, further including a sorting circuit configured to sort the pixel data so that the first ones of the exposures correspond to relatively longer exposure times, and the second ones of the exposures correspond to relatively shorter exposure times.

7. The integrated circuit of claim 1, wherein the shared memory comprises a shared double data rate memory.

8. The integrated circuit of claim 1, wherein to process the merged pixel data, the image pipeline circuit is configured to perform tone mapping on the merged pixel data representing the image.

9. A method for processing, in an integrated circuit, image data from a digital overlap (DOL) wide dynamic range (WDR) sensor, the method comprising:
receiving pixel data corresponding to multiple exposures of an image;
storing first received pixel data associated with one or more first ones of the exposures of the image in a shared memory circuit of the integrated circuit;
storing second received pixel data associated with one or more second ones of the exposures of the image in a first buffer of the integrated circuit;
storing third received pixel data associated with a third exposure of the image in a second buffer of the integrated circuit;
selecting, by a first multiplexer coupled to two or more outputs of the shared memory circuit, first pixel data from the shared memory circuit;
selecting, by a second multiplexer coupled to outputs of the first and second buffers, second pixel data from the shared memory circuit;
performing merge processing of the first and second selected pixel data to create merged pixel data representing the image;
storing the merged pixel data to a corresponding partition of a line buffer for separate access by an image pipeline circuit of the integrated circuit; and
processing the merged pixel data using the image pipeline circuit.

10. The method of claim 9, further comprising providing fourth received pixel data associated with a fourth exposure of the image to a merge circuit of the integrated circuit, without storing the fourth received pixel data in the shared memory circuit, the first buffer, or the second buffer.

11. The method of claim 9, further including sorting the received pixel data so that the first ones of the exposures correspond to relatively longer exposure times, and the second ones of the exposures correspond to relatively shorter exposure times.

12. The method of claim 9,
wherein the method includes processing, in the integrated circuit, image data from multiple DOL WDR sensors; and
wherein the receiving, storing first, second, and third received pixel data, performing, and storing merged pixel data steps are performed for each of the DOL WDR sensors.

13. The method of claim 12, further including partitioning the line buffer of the integrated circuit in response to a number of DOL WDR sensors connected to the integrated circuit.

14. The method of claim 12, wherein the processing is performed in an interleaved fashion for the multiple DOL WDR sensors.

15. The method of claim 12, further including storing statistics responsive to image data from different ones of the DOL WDR sensors in different ones of multiple partitions of a statistics buffer of the integrated circuit.

16. The method of claim 9, wherein processing the merged pixel data comprises performing tone mapping on the merged pixel data representing the image.

17. An integrated circuit comprising:
a shared memory;
a first buffer;
a pixel data interface circuit configured to receive pixel data corresponding to multiple exposures of an image from a digital overlap (DOL) wide dynamic range (WDR) sensor, the pixel data interface circuit configured to store pixel data corresponding to one or more first ones of the exposures of the image in the shared memory, and to store pixel data corresponding to one or more second ones of the exposures of the image in the first buffer;
a first multiplexer including two or more inputs coupled to the shared memory;
a second multiplexer including two or more inputs coupled to the first buffer;
a merge circuit configured to receive the pixel data corresponding to the first ones of the exposures of the image from the shared memory via the first multiplexer, receive the pixel data corresponding to the second ones of the exposures of the image from the first buffer via the second multiplexer, and process the pixel data corresponding to the first and second ones of the exposures of the image to create merged pixel data representing the image; and
an image pipeline circuit configured to process the merged pixel data representing the image; and
a line buffer configured to store at least one line of the merged pixel data representing the image for processing by the image pipeline circuit.

18. The integrated circuit of claim 17, further including a sorting circuit configured to sort the pixel data so that the first ones of the exposures correspond to a relatively longer exposure time, and the second ones of the exposures correspond to a relatively shorter exposure time.

19. The integrated circuit of claim 17, wherein the shared memory comprises a shared double data rate memory.

20. The integrated circuit of claim 17, wherein to process the merged pixel data, the image pipeline circuit is configured to perform tone mapping on the merged pixel data representing the image.

* * * * *